No. 718,084. PATENTED JAN. 13, 1903.
C. S. BRADLEY.
GENERATING ALTERNATING CURRENTS.
APPLICATION FILED JUNE 22, 1896.
NO MODEL.
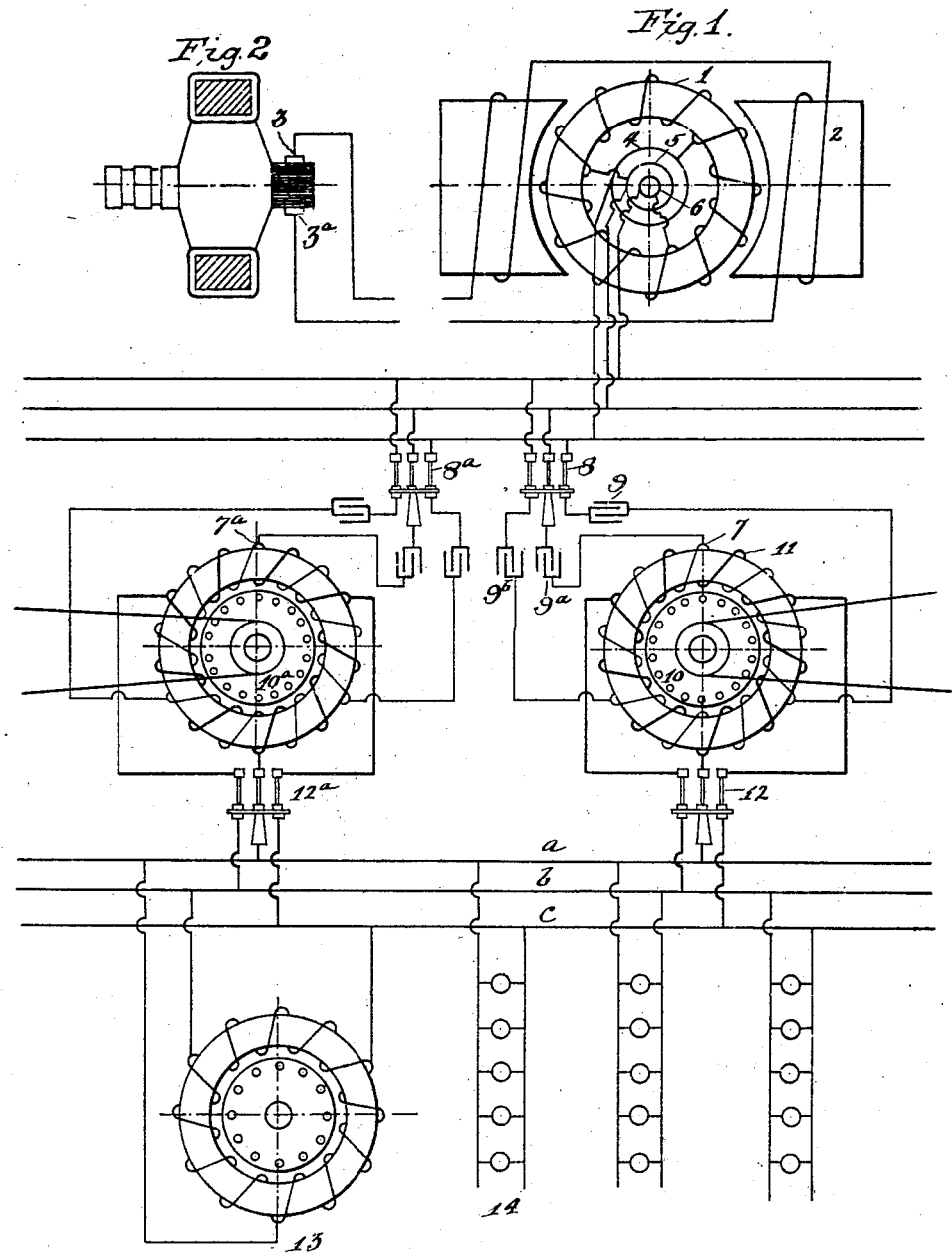

UNITED STATES PATENT OFFICE.

CHARLES S. BRADLEY, OF AVON, NEW YORK, ASSIGNOR TO GENERAL ELECTRIC COMPANY, A CORPORATION OF NEW YORK.

GENERATING ALTERNATING CURRENTS.

SPECIFICATION forming part of Letters Patent No. 718,084, dated January 13, 1903.

Application filed June 22, 1896. Serial No. 596,427. (No model.)

*To all whom it may concern:*

Be it known that I, CHARLES S. BRADLEY, a citizen of the United States, and a resident of Avon, in the county of Livingston, in the State of New York, have invented certain new and useful Improvements in Generating Alternating Currents, of which the following is a specification.

This invention relates to the generation of alternating currents by the inductive reaction of a rotary magnetic field and a closed-circuited relatively movable coöperating element driven above synchronism with relation to said rotary field.

One object of the invention is to permit an exciter of low electromotive force to furnish the magnetizing-current of a rotary field or a plurality of such fields.

Another object is to permit a number of such generators to be thrown upon a distribution-circuit supplying induction-motors and other translating devices as the load may require without the necessity of bringing the several generators into synchronism.

The invention is carried out by means of an exciter capable of generating alternating currents of low voltage, these currents being connected through switching devices with the magnetizing-windings of one or a plurality of induction-generators the coöperating elements of which are provided with windings closed upon themselves and are driven by a prime mover at a speed above that of the poles of the rotary field. The generators are provided also with an auxiliary winding in which induced currents are developed by the reaction of the closed-circuited element on the rotary field, and this winding is connected with the distribution or consumption circuit. The magnetizing-circuits, including the exciter and rotary field, are rendered electrically resonant by devices for adjusting the capacity inductance product, so that the capacity of each circuit or branch in microfarads multiplied by the inductance in henries will equal twenty-five thousand three hundred divided by the square of the rate of alternation of the exciter. The exciter is preferably adapted to generate polyphase currents and is operated at constant speed, so that a condenser employed to produce resonance may have a constant adjustment relatively to the inductance, which latter will fluctuate but little with change of load. The interposition of condensers raises the voltage in the rotary field and produces a much greater magnetizing effect on the rotary field than would be possible without their employment.

The invention comprises a generator having a magnetizing-winding supplied by an exciter through condensers and a rotor or movable element driven above synchronism in the rotary field.

It comprises also an auxiliary winding in inductive relation to the rotary field for leading off induced currents.

The several features of novelty will be hereinafter fully described and will be definitely indicated in the claims.

In the accompanying drawings, Figure 1 is a diagram of a system embodying my improvements, and Fig. 2 is a sectional view showing the construction of the exciter-armature.

1 represents an exciter-armature driven in inductive relation to a field-magnet 2 charged by a direct current. The exciter is shown in sectional side elevation in the detached view, Fig. 2. The organization may be simplified by commutating the armature-currents and leading the direct current thus generated through brushes 3 $3^a$ to the field-magnet winding, as shown in the detached view of the exciter. The armature-winding is tapped at a plurality of symmetrical points and connected with ring-contacts 4 5 6, upon which bear brushes leading to one or more magnetizing-windings 7 $7^a$ of induction-generators. The system is shown organized for operation with triphase currents, though it will be understood that polyphase currents of any order may be employed. Single-phase currents may also be employed, as the reaction of the two generator elements will in such cases set up a rotary magnetic field. Switches 8 $8^a$ are interposed between the exciter and the magnetizing-windings of the generator, and in each branch of the circuit is a condenser 9 $9^a$ $9^b$, adjusted to a value to produce electrical resonance. The generator magnetizing-windings are disposed so as to set up a rotary magnetic field. In inductive relation to the rotary field is a coöperating element 10 10ª, adapted to be driven above synchronous speed by any suitable prime mover, indicated as a driving-belt 15. The coöperating element 10 may conveniently be provided with a squirrel-cage winding, consisting of copper conductors threading the core parallel to the axis and connected together at the ends by conducting-disks. In inductive relation to the rotary field of the generator is an auxiliary winding 11, in which electromotive force is generated by the reaction following the cutting of the rotary field of force by the conductors of the rotary member. The auxiliary winding may be closed upon itself and tapped at symmetrical points connecting with a switch 12, by which polyphase current may be thrown into a distribution-circuit $a\ b\ c$. The distribution-circuit may supply induction-motors, lamps, or other translating devices, as indicated at 13 14. It is not necessary that the auxiliary winding should have the same relation to the core as the rotary-field winding, provided it be in inductive relation to the magnetic circuit.

In an organization as thus described the exciter sets the rate of alternation or time period of the whole system, and the currents generated in the generator-circuits will of necessity coincide with this rate. The several generator-rotors or revolving members may be given any speed, provided it be above synchronism—that is to say, provided its conductors move faster than the poles of the rotary field—and yet the period or rate of the generated currents in the auxiliary winding will be the same. It follows, therefore, that when the load varies in the distribution network additional generators may be thrown upon the circuit to maintain the current without adopting special means to synchronize them with the generators already at work. The preferable mode of procedure is to first connect the rotor with the prime mover and raise it to a speed above synchronism and then close the switches leading to the exciter and distribution circuits, respectively. By reason of the resonant adjustment of the magnetizing-circuits an exciter of low electromotive force may be employed, and yet a strong magnetizing-current will flow in the magnetizing-winding and charge the induction-generator. The auxiliary winding may of course be arranged to produce any desired voltage.

By adjustment of the condensers to effect resonance a small exciter may be used, and even without a resonant adjustment the addition of capacity to the circuit permits a smaller exciter than must otherwise be employed, the capacity acting also to produce a better relation of the magnetizing and work current.

Having thus described my invention, what I claim as new, and desire to secure by Letters Patent, is—

1. An induction-generator for alternating currents comprising a magnetizing-winding, an exciter for supplying current thereto, a prime mover for driving the generator above synchronism with the rate of the magnetizing-current, and an auxiliary winding for connection with the distribution-circuit, said winding being in inductive relation to the rotary field-core.

2. An induction-generator having two stationary windings in inductive relation to a power-driven secondary, one in a magnetizing-circuit and the other in a work-circuit.

3. An alternating-current system comprising a plurality of generators provided with rotary-field windings, an exciter or source of magnetizing-current of definite rate of alternation, condensers of similar capacities in the branches connecting the exciter and the rotary-field windings, and switches for cutting the generators in and out of the distribution-circuit.

4. An alternating-current system comprising a plurality of induction-generators in parallel relation provided with rotary-field windings, a polyphase exciter, condensers in the connecting-circuits, and auxiliary windings on the several generators in inductive relation to the rotary fields, said auxiliary windings connecting with a distribution or consumption circuit.

In testimony whereof I have hereunto subscribed my name this 23d day of May, A. D. 1896.

CHARLES S. BRADLEY.

Witnesses:
C. R. WATERBURY,
ROBT. H. READ.